Figure 1:
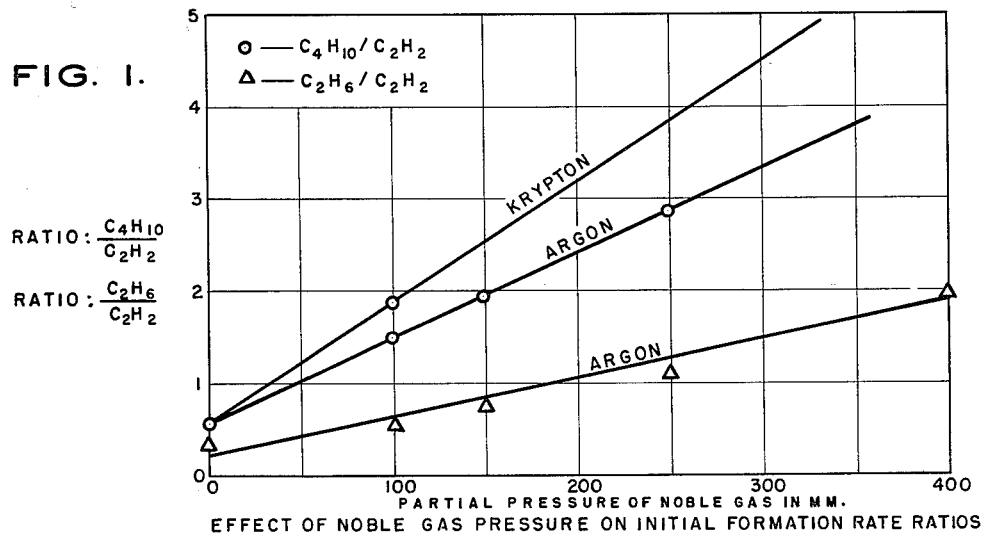

EFFECT OF NOBLE GAS PRESSURE ON INITIAL FORMATION RATE RATIOS

HYDROGEN ATOM SENSITIZATION BY XENON

INVENTOR.
FREDERICK W. LAMPE,

United States Patent Office

3,092,561
Patented June 4, 1963

3,092,561
METHOD FOR PRODUCING ATOMIC HYDROGEN
Frederick W. Lampe, Baytown, Tex., assignor, by mesne assignments, to Esso Research and Engineering Company, Elizabeth, N.J., a corporation of Delaware
Filed Jan. 20, 1960, Ser. No. 3,563
5 Claims. (Cl. 204—154)

This invention relates to a method for the production of atomic hydrogen. More particularly, this invention relates to a method for substantially selectively converting significant quantities of molecular hydrogen to atomic hydrogen.

This application is a continuation-in-part of F. W. Lampe application Serial No. 805,326, filed April 9, 1959, and entitled "Method for the Production of Atomic Hydrogen," now abandoned.

Molecular hydrogen is widely used in industry for a wide variety of purposes due to its ready availability and chemical properties.

Atomic hydrogen, on the other hand, is not utilized to any significant extent at the present time because there is no known practical method for producing atomic hydrogen in significant quantities.

It has heretofore been proposed to utilize ionizing radiation as a means for initiating or otherwise promoting chemical reactions. The use of ionizing radiation has been severely curtailed, however, because of the fact that ionizing radiation is non-selective in its action.

It has now been discovered, however, that the energy present in high-energy ionizing radiation may be substantially and selectively utilized for the selective conversion of molecular hydrogen to atomic hydrogen.

Briefly, in accordance with the present invention, molecular hydrogen is mixed with one or a plurality of gaseous radiation acceptors (as hereinafter positively defined) and the thus-formed mixture is subjected to high energy ionizing radiation whereby the ionizing radiation is initially absorbed by the gaseous acceptor and thereafter substantially quantitatively transferred to molecular hydrogen to bring about a selective dissociation of the hydrogen molecules into atomic hydrogen. It is a feature of the present invention that a volatile hydrogen atom acceptor is present in order to prevent hydrogen atom recombination to form molecular hydrogen.

The term "gaseous radiation acceptor" as used herein means helium, neon, argon, krypton, xenon, nitrogen, carbon monoxide, and mixtures thereof. The molecular ions of these compounds have a common physical property in that they have a proton affinity larger than the bond strength of the hydrogen molecule.

The term "hydrogen atom acceptor" refers to a chemical compound which will react with or be acted upon by atomic hydrogen. Thus, for example, the hydrogen atom acceptor may be an organic compound such as an olefinic hydrocarbon, a paraffinic hydrocarbon, an aromatic hydrocarbon, etc. and derivatives thereof such as hydroxides, ketones, aldehydes, acids, epoxides, amides, amines, nitrates, nitrites, sulfates, etc. Inorganic compounds which accept atomic hydrogen may also be utilized such as carbon tetrachloride, hydrogen chloride, hydrogen bromide, bromine, chlorine, ammonia, and hydrogen sulfide. In short, the chemical identity of the hydrogen atom acceptor is not relevant to the process of the present invention but is significant to the extent that the process of the present invention provides the mechanism whereby the hydrogen atom acceptor may be converted into derivatives thereof by atomic hydrogen reactions with a selectivity that has been heretofore unobtainable.

The process of the present invention is essentially independent of pressure and temperature, provided only that the process is conducted in gas phase. Thus, subatmospheric and superatmospheric pressures may be used within the limits prescribed by the strength of the reaction vessel employed. Likewise, temperatures above and below 0° C. may be used, limited only by the physical limitations of the equipment. A wide selection of atomic hydrogen acceptors is therefore possible. Thus, consultation of any standard reference giving the physical constants of inorganic or organic compounds will provide a listing of acceptable atomic hydrogen acceptors (see, for example, Lange's Handbook of Chemistry). The wide selectivity of acceptors for reaction with atomic hydrogen is feasible for the additional reason that atomic hydrogen is one of the most reactive chemical species that is known.

From the foregoing, it is seen, therefore, that the present invention opens a new field of chemical endeavor and that the entry of this field is provided by the present method which makes possible production of significant quantities of atomic hydrogen at any desired temperature or pressure.

The gaseous feed mixture for the present invention, as indicated, is comprised of a mixture of molecular hydrogen, a gaseous ionizing radiation acceptor and a gaseous hydrogen atom acceptor. The hydrogen atom acceptor should preferably constitute from about 1 to 10 volume percent of the total mixture. In determining the relative proportions of gaseous ionizing radiation acceptor to hydrogen to be utilized, the following equation may be employed wherein the numerical value for the quantity $F_{H_2}+F_X=0.5$ to $0.95$.

The complete equation to be utilized is as follows:

$$F_{H_2}+F_X=\frac{P_X Z_X + 2P_{H_2}}{P_X Z_X + 2P_{H_2} + P_S Z_S}$$

Wherein $F_{H_2}$ is the fraction of the energy absorbed by hydrogen;

Wherein $F_X$ is the fraction of the energy absorbed by the radiation acceptors;

Wherein $P_X$ is the pressure of the gaseous radiation acceptors;

Wherein $Z_X$ is the total number of electrons contained in a molecule of the gaseous radiation acceptor;

Wherein $P_{H_2}$ is the pressure of molecular hydrogen;

Wherein $P_S$ is the pressure of the hydrogen atom acceptor; and

Wherein $Z_S$ is the number of electrons contained in a molecule of the hydrogen atom acceptor.

In this equation, $F_{H_2}+F_X+F_S$ is equal to 1.

For further clarification of the meaning of the above-identified terms and the manner in which they may be determined on an absolute basis, consult W. Heitler, Quantum Theory of Radiation, Oxford Univ. Press, 1954.

By way of example, if it is desired to use kyrpton as the radiation acceptor and ethylene as the hydrogen atom acceptor at an ethylene pressure of 30 p.s.i. and a hydrogen pressure of 300 p.s.i., the pressure of krypton to be used to obtain a 95% selectivity of the ionizing radiation into atomic hydrogen production would be determined as follows for $P_{Kr}$:

$Z_X=36$      $P_S=30$ p.s.i.
$P_{H_2}=300$ p.s.i.      $Z_S=16$
then:

$$0.95=\frac{36P_{Kr}+600}{36P_{Kr}+600+480}$$

or:

$$P_{Kr}=\frac{0.95(600+480)-600}{36(1-0.95)}=237 \text{ p.s.i.}$$

For argon, the calculation would be as follows:

$$P_A=\frac{0.95(600+480)-600}{18(1-0.95)}=473 \text{ p.s.i.}$$

For xenon, the calculation would be:

$$P_{Xe} = \frac{0.95(600+480)-600}{54(1-0.95)} = 158 \text{ p.s.i.}$$

Any source of ionizing radiation may be utilized in accordance with the present invention. Thus, the form of ionizing radiation that is utilized is not critical with respect to the present invention. For example, there may be utilized high energy electrons (about 50,000 electron volts or more), beta rays, gamma rays, bremsstrahlung, X-rays, alpha particles, tritons, deuterons, protons, and also recoil entities of nuclear fission, fusion and spoilation reactions. However, the energy of the impacting particles should be below the threshold of nuclear processes. This factor will vary from radiation type to radiation type. However, the thresholds are well known and are identified in various texts.

As indicated, the energy of the radiation should be sufficient to produce ionization, that is greater than 25 electron volts.

In general, it may be stated, therefore, that the intensity of the ionizing radiation should be within the range of about 0.12 to about 4200 watts per gram of gaseous feed mixture and that the total radiation dosage may be within the range of about 0.36 to about 12,000 watthours per gram of gaseous feed mixture.

The invention will be further illustrated by way of the following specific examples which are given by way of illustration and not intended as limitations on the scope of this invention.

For Examples I and II, the equipment utilized was as follows:

The radiation employed in the studies was the electron beam from a Van de Graaff electrostatic accelerator. The accelerating voltage in all experiments was kept at 2.0 million volts, the electron beam current, at the small 1 inch aluminum exit window of the Van de Graaff accelerator, was maintained at about 5 microamperes, and the beam was focused to a point about 4 mm. in diameter at the 1 inch exit window. The total dosage for each experiment varied from $8.1 \times 10^{18}$ e.v./cm.³ to $5.0 \times 10^{19}$ e.v./cm.³.

The vessels in which the gaseous irradiations were carried out consisted of cylindrical Pyrex tubes, of 22 mm. outside diameter and 19 mm. inner diameter. To one end of the tube was sealed a 1/16 inch diameter tungsten wire which supported and made electrical contact with a stainless steel disk that was 17 mm. in diameter and 3 mm. in thickness and which was positioned inside the tube at a distance of about 800 mm. from the Pyrex window. This disk served to monitor the electron current and give some measure of the average electron current traversing the gas. A high-vacuum stopcock connected to a 14/35 Standard Taper joint was sealed to the tube between the disk position and the tungsten-glass seal for filling and evacuation purposes.

Research Grade ethylene, having a stated purity of 99.9+ mol percent, was frozen out in liquid nitrogen and then allowed to distill slowly into an evacuated ($10^{-6}$ mm.) storage bulb on the vacuum system. The middle third of the frozen out sample was collected. Hydrogen (99%), argon (99+%), krypton (99+%), xenon (99+%), neon (99+%), carbon monoxide (99+%) and nitrogen (99+%) were used without further purification.

The experiments were conducted at room temperature.

EXAMPLE I

This example is directed to radiation experiments wherein the hydrogen acceptor was ethylene and is cited to show the improvement obtainable with the present invention.

The analysis of products, which consisted essentially of acetylene, ethane, propane, and n-butane, was carried out by vapor-liquid partition chromatography. The use of two columns (hexadecane and benzyl Cellosolve substrates on 40- to 60-mesh crushed firebrick) enabled complete separation and determination of all components, and, further, permitted internal checks between the two columns on the propane and acetylene analyses.

Generally speaking, the irradiations reported in this paper were of systems containing 300 mm. of hydrogen, 30 mm. of ethylene, and varying amounts of sensitizer. Thus, in all systems, the depletion of ethylene was necessarily very rapid and, since quantitative comparison of the sensitization effect must be made at identical ethylene concentrations, it was necessary to measure initial reaction rates. This was done by extrapolation of four or five apparent rates (amount of product divided by reaction time) to zero time. All reaction rates reported are initial rates.

The rate of energy absorption for the runs of Experiment I in electron volts per cubic centimeter per hour can be determined by the formula:

$$dE/dt = 2.7 \times 10^{18} + \left(\frac{P_x Z_x}{18}\right) 4.7 \times 10^{16}$$

wherein:

X is the radiation acceptor;

$Z_x$ is the number of electrons in the radiation acceptor; and $P_x$ is the pressure in mm. of mercury of the radiation acceptor.

Electron radiolysis studies of ethylene (B. M. Miklailov, V. G. Kiselev, and V. S. Bogdanov, "Radioactive Chemical Conversions of Organic Compounds. Part 3. Conversions of Ethylene Under the Action of Fast Electrons," Izv. Akad. Nauk (Khim.), No. 5,545 (1958)) have shown that the gaseous reaction products consist of butane, ethylene, hydrogen, methane, ethane and butene while the liquid products comprise low molecular weight polymeric products of ethylene including $C_6$ and $C_8$ aliphatic hydrocarbons, aromatics, and olefins. Acetylene is the major product.

Experiment 1a

In order to confirm the experimental results of ethylene irradiation mentioned above, a charge stream consisting of gaseous ethylene was irradiated in the equipment described above at initial ethylene pressures of 75 and 150 mm. of mercury. The results are set forth below in Table I.

TABLE I.—100-ELECTRON VOLT YIELDS IN ETHYLENE RADIOLYSIS AT 25° C.

| Compound | G (75 mm.) | G (150 mm.) |
| --- | --- | --- |
| $C_2H_4$ | −14.2±2.3 | −15.5±1.8 |
| $H_2$ | 1.14±0.28 | 1.28±0.19 |
| $CH_4$ | 0.13±0.02 | 0.12±0.02 |
| $C_2H_2$ | 1.52±0.04 | 1.46±0.10 |
| $C_2H_6$ | 0.40±0.01 | 0.27±0.10 |
| $C_3H_6$ | 0.26±0.02 | 0.23±0.04 |
| $C_3H_8$ | 0.33±0.02 | 0.11±0.03 |
| n-$C_4H_{10}$ | 0.50±0.03 | 0.48±0.05 |
| cis. $C_4H_8$-2 | 0.21±0.12 | 0.12±0.04 |
| trans $C_4H_8$-2 | 0.12±0.02 | 0.14±0.05 |
| 1-$C_4H_8$ (or iso) | 0.17±0.04 | 0.14±0.04 |
| n-$C_5H_{12}$ | 0.13±0.05 | 0.06±0.02 |
| n-$C_6H_{14}$ | 0.16±0.06 | 0.13±0.04 |

The "G" values were obtained by measurement of initial slopes of plots in which the amount of the product formed (or consumed in the case of ethylene) was plotted with respect to the energy absorbed.

From Table I, it will be seen that the course of the reaction, as reflected by the "G" values, is essentially independent of ethylene pressure. The major product of this reaction is acetylene, as shown by the table.

The gaseous products of the experiment accounted for only about one-third of the ethylene that was reacted. The remaining two-thirds of the ethylene was converted into polymeric materials.

Experiment 1b

In this experiment, a series of runs were made wherein the feed mixture was 30 mm. of ethylene in all instances, 300 mm. of hydrogen in all instances, and partial pressures of argon ranging from 0 to 400 mm. The rate of absorption of energy in units of e.v./cm.$^3$ per hour was: $dE/dt = 2.7 \times 10^{18} + 4.7 \times 10^{16} P$ when P is the pressure of argon in mm. of Hg. During the course of the experiments, the following experimental facts were determined:

(1) The only significant products were n-butane, ethane, ethylene, and propane, which accounted for about 70 to 80 percent of the reacted ethylene. This is in contrast with the results for pure ethylene.

(2) The initial rate of acetylene formation is independent of argon concentration.

(3) The initial rates of formation of ethane and butane increase with argon concentration.

This is graphically portrayed in FIG. 1 of the attached drawing.

Since the rate of formation of acetylene is independent of argon concentration, the ratio of the rate of formation of any of the other products to the rate of formation of the acetylene is a measure of the selectivity of absorption of radiation into the particular process forming that product. It is well known (E. W. R. Steacie, "Atomic and Free Radical Reactions," Reinhold Publishing Corp., 1954) that the principal result of the attack of hydrogen atoms upon ethylene at room temperature is the formation of n-butane and ethane. Moreover, at room temperature, the ratio of formation of ethane to butane via hydrogen atom attack on ethylene has a quite definite value which is equal to the ratio of the slope of the ethane line to the slope of the butane line. The ratio of these slopes is found to be 0.39 which is in excellent agreement with the corresponding value found from independent studies of mercury diethyl photolysis (see Steacie reference) and, therefore, provides firm proof that the increases in butane and ethane as a result of adding argon to the system are due to the reactions of hydrogen atoms. This, therefore, establishes the selectivity of the hydrogen atom reaction brought about by the addition of the radiation acceptor, which in this experiment is argon.

The reaction mechanism that occurs with respect to the argon is as follows:

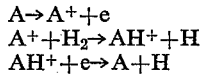

$$A \rightarrow A^+ + e$$
$$A^+ + H_2 \rightarrow AH^+ + H$$
$$AH^+ + e \rightarrow A + H$$

From the above series of equations, it is seen that the argon has functioned as an acceptor of the radiation energy and has effectively transferred the radiation energy to molecules of hydrogen, thereby causing a dissociation resulting in production of atomic hydrogen and regeneration of argon.

Experiment 1c

Identical experiments to those in Experiment 1b were conducted but with the substitution of krypton for argon. These experiments show a larger slope in the butane to acetylene ratio as a function of krypton pressure than that observed in FIG. 1 for argon. This increase in slope is in complete accord with the proposed mechanism, thereby affording confirmatory proof of selective channeling of radiation energy into hydrogen atom production.

If xenon is utilized in place of the argon of Experiment 1b, an even larger increase of slope than that observed in Experiment 1c would be seen. If helium or neon is utilized in place of argon and Experiment 1b is otherwise repeated, the slopes of FIG. 1 are smaller. The foregoing demonstrates that xenon is a preferred ionizing radiation acceptor in that it can absorb a predominant amount of energy at the lowest pressure of any of the gases. This is further shown by the following additional experimental evidence.

Experiment 1d

Figure 2:
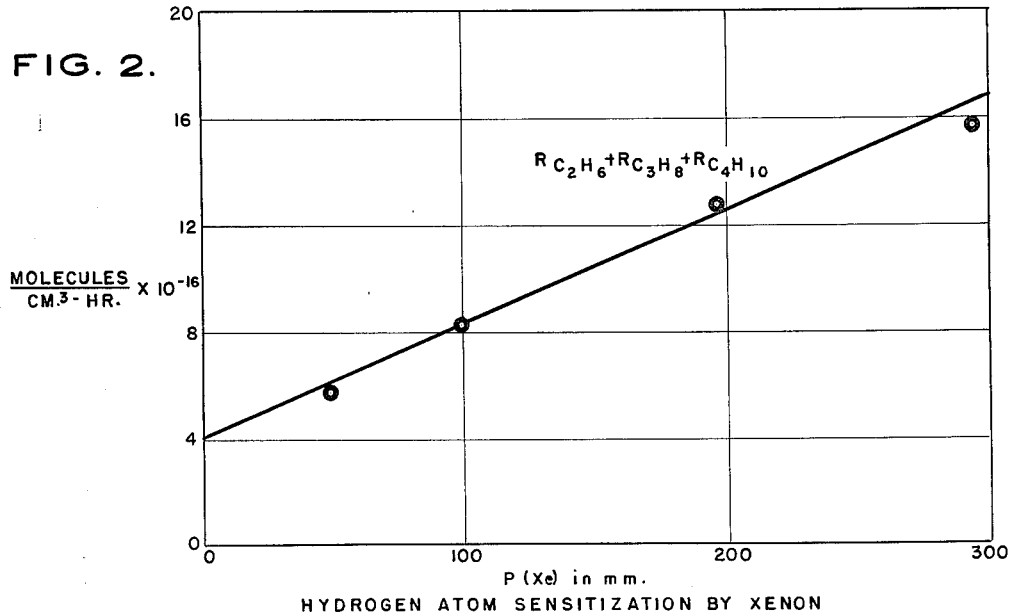

Identical experiments to those in Experiment 1b were conducted but with the substitution of xenon for argon. The results of this series of experiments are shown in FIG. 2.

Experiment 1e

Figure 3:
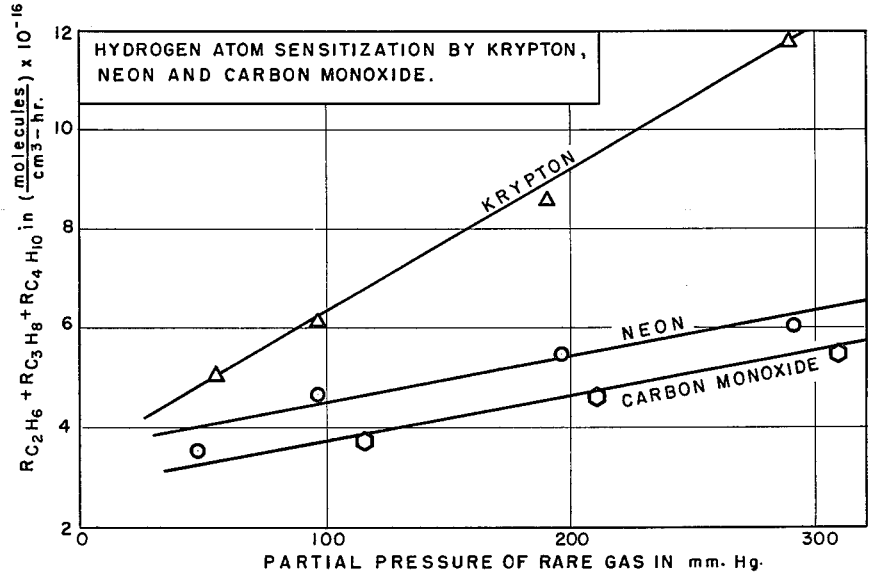

Identical experiments to those in Experiment 1b were conducted but with the substitution of neon for argon. The results of this series of experiments are shown in FIG. 3.

Experiment 1f

Identical experiments to those in Experiment 1b were conducted but with the substitution of carbon monoxide for argon. The results of this series of experiments are shown in FIG. 3.

Experiment 1g

Identical experiments to those in Experiment 1b were conducted but with the substitution of krypton for argon. The results of this series of experiments are shown in FIG. 3.

Experiment 1h

Figure 4:
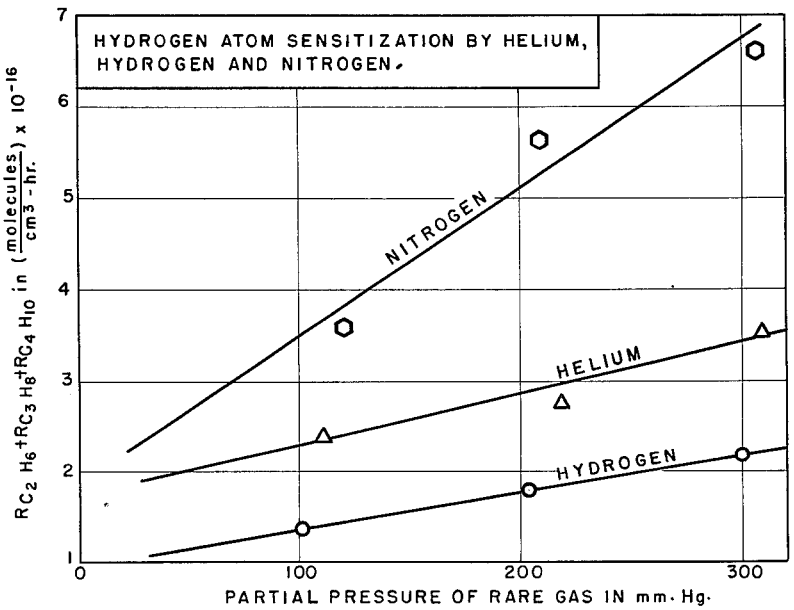

Identical experiments to those in Experiment 1b were conducted but with the substitution of nitrogen for argon. The results of this series of experiments are shown in FIG. 4.

Experiment 1i

Identical experiments to those in Experiment 1b were conducted but with the substitution of helium for argon. The results of this series of experiments are shown in FIG. 4.

EXAMPLE II

For this experiment, the same equipment and experimental techniques including a temperature of 25° C. were utilized as were utilized in the case of Example I. However, in this instance, the hydrogen atom acceptor was cis-1,3-butadiene. In this case three runs were made. 50 mm. of butadiene were used in the first run (Experiment II–1a). In the second run 50 mm. of butadiene and 300 mm. of hydrogen were utilized (Experiment II–1b). In the third run 50 mm. of butadiene, 300 mm. of hydrogen and 300 mm. of argon were utilized (Experiment II–1c). The radiation dosage was varied from $1.6 \times 10^{19}$ e.v./cm.$^3$ to $8.0 \times 10^{19}$ e.v./cm.$^3$. The following observations were made: the measure of the amount of radiation absorbed directly by butadiene in the radiolysis of mixtures can be obtained by observation of the acetylene produced. Acetylene is formed in the radiolysis of pure butadiene (Experiment II–1a) and, moreover, the rate of formation of acetylene was independent of hydrogen or argon pressure in the mixture experiments (Experiments II–1b and II–1c). On the other hand, there was an increase in the rate of formation of butene as hydrogen was added to the system (Experiment II–1b) and a further marked increase in the rate of formation of butene as argon and hydrogen were added to the system. These observations are in complete accord with the conclusions of Experiment I.

The rates of absorption of energy for these examples were:

II (1a): $dE/dt = 4.0 \times 10^{18}$ e.v./cm.$^3$/hr.
II (1b): $dE/dt = 5.6 \times 10^{18}$ e.v./cm.$^3$/hr.
II (1c): $dE/dt = 2.0 \times 10^{19}$ e.v./cm.$^3$/hr.

EXAMPLE III

The radiation vessel for this experiment differed from the radiation vessel for Examples I and II. The radiation vessel for this experiment was constructed of stainless steel, was cylindrical in shape, and had an internal volume of 1.5 liters. The reactor window through which the electrons passed consisted of 19¼" holes drilled in a hexagonal pattern which were covered with a 0.013" thick stainless steel plate welded to the head of the vessel.

In this experiment, the electron beam current was held at 100 microamperes, as contrasted with experiments described in Examples I and II. The hydrogen atom acceptor in this experiment was C.P. degassed benzene, at a pressure of approximately 15 pounds per square inch gauge. The temperature of the reaction vessel and all connecting lines thereto was kept above the critical temperature of benzene (288.5° C.). The pressure of hydrogen was 100 p.s.i.g. and the pressure of argon was 200 p.s.i.g. The results of these experiments show considerable differences from the known radiolysis of benzene, namely in that the major products identified so far have been cyclohexane, methyl pentenes and some light paraffins. No biphenyl has been detected. The only products so far identified are n-butane, isobutane, propane 2-methyl-1-pentene, 3-methyl-2-pentene, and cyclohexane.

Having described my invention, what is claimed is:

1. A method for preparing atomic hydrogen which comprises subjecting a mixture of hydrogen and a gaseous ionizing radiation acceptor having a proton affinity larger than the bond strength of the hydrogen molecule to ionizing radiation in the presence of a minor amount of hydrogen atom acceptor, said radiation acceptor being selected from the group consisting of helium, neon, argon, krypton, xenon, nitrogen, carbon monoxide, and mixtures thereof, the intensity of said ionizing radiation being within the range of about 0.12 to about 4200 watts per gram of said mixture and the total radiation dosage being within the range of about 0.36 to about 12,000 watt hours per gram of said feed mixture, said mixture containing from about 35 to 60 volume percent of said gaseous ionizing radiation acceptor and, correspondingly, from about 64 to about 30 volume percent of molecular hydrogen and from about 1 to 10 volume percent of said hydrogen atom acceptor.

2. A method for preparing atomic hydrogen which comprises subjecting a mixture of hydrogen and a noble gas having a proton affinity larger than the bond strength of the hydrogen molecule to ionizing radiation in the presence of a minor amount of hydrogen atom acceptor, the intensity of said ionizing radiation being within the range of about 0.12 to about 4200 watts per gram of said mixture and the total radiation dosage being within the range of about 0.36 to about 12,000 watt hours per gram of said feed mixture, said mixture containing from about 35 to 60 volume percent of said noble gas and, correspondingly, from about 64 to about 30 volume percent of molecular hydrogen and from about 1 to 10 volume percent of said hydrogen atom acceptor.

3. A method as in claim 2 wherein the noble gas is argon.

4. A method as in claim 2 wherein the noble gas is xenon.

5. A method as in claim 2 wherein the noble gas is krypton.

References Cited in the file of this patent

UNITED STATES PATENTS 2,863,729    McDuffie et al. _____ Dec. 9, 1958

FOREIGN PATENTS 665,263    Great Britain _____ Jan. 23, 1952